United States Patent [19]
Funatsu

[11] Patent Number: 5,957,576
[45] Date of Patent: Sep. 28, 1999

[54] SCREW FOR IN-LINE SCREW TYPE THERMOSETTING RESIN INJECTION MOLDING MACHINE

[75] Inventor: Eiji Funatsu, Fujieda, Japan

[73] Assignee: Sumitomo Bakelite Company Limited, Tokyo, Japan

[21] Appl. No.: 08/673,206

[22] Filed: Jun. 27, 1996

[30] Foreign Application Priority Data

Jun. 30, 1995 [JP] Japan ................................. 7-165042
Jun. 30, 1995 [JP] Japan ................................. 7-165043

[51] Int. Cl.$^6$ ........................................................... B29B 7/14
[52] U.S. Cl. ................................. 366/78; 366/81; 366/88; 425/209
[58] Field of Search ............................. 366/78–81, 83–85, 366/88–90, 318–319, 323–324; 425/208, 209, 204

[56] References Cited

U.S. PATENT DOCUMENTS

| | | | |
|---|---|---|---|
| 2,453,088 | 11/1948 | Dulmage | 366/82 |
| 3,868,093 | 2/1975 | Sokolow | 366/89 X |
| 4,155,655 | 5/1979 | Chiselko et al. | 425/208 X |
| 4,695,165 | 9/1987 | Fukumizu et al. | 425/209 X |
| 4,697,928 | 10/1987 | Csongor | 425/208 X |
| 4,779,989 | 10/1988 | Barr | 366/88 X |
| 4,842,414 | 6/1989 | Dray | 366/89 X |
| 4,963,033 | 10/1990 | Huber et al. | 366/319 X |
| 4,966,539 | 10/1990 | Pena | 366/78 X |
| 5,127,741 | 7/1992 | Capelle et al. | 366/89 X |
| 5,178,458 | 1/1993 | Hsu | 366/89 |
| 5,297,948 | 3/1994 | Sadr | 366/319 X |

FOREIGN PATENT DOCUMENTS

| | | | |
|---|---|---|---|
| 59-73931 | 4/1984 | Japan | 366/79 |
| 59-103733 | 6/1984 | Japan | 366/79 |
| 5-228920 | 9/1993 | Japan | 366/81 |
| 1699783 | 12/1991 | U.S.S.R. | 366/88 |

*Primary Examiner*—Charles E. Cooley
*Attorney, Agent, or Firm*—Browdy and Neimark

[57] ABSTRACT

A screw for an in-line screw type thermosetting resin injection molding machine comprises a resin kneading portion in a front end portion of a full-flighted screw. In the resin kneading portion, a groove having a crest portion and a trough portion formed spirally in a circumferential direction, and a step portion. A difference between a radial dimension of the step portion and an outermost radial dimension of the crest portion is 10% to 60% of a difference between the outermost radial dimension of the crest portion and an innermost radial dimension of the trough portion. The axial length of the resin kneading portion is 0.5 to 2 times as long as the outer diameter of the full-flighted screw, or 0.5 to 2 times as long as the pitch of the full-flighted screw.

14 Claims, 3 Drawing Sheets

SCREW FOR IN-LINE SCREW TYPE THERMOSETTING RESIN INJECTION MOLDING MACHINE

DETAILED DESCRIPTION OF THE INVENTION

1. Field of the Invention

This invention relates to a screw for an in-line screw type thermosetting resin injection molding machine.

2. Description of the Prior Art

Generally speaking, a thermosetting resin has a characteristic property by which it is initially plasticized by heating, then cured by additional heating and is not plasticized again. This property is distinguished from the property of an ordinary thermoplastic resin which always made molten by heating. A molding technique for thermosetting resin has the following problems which are quite different from those which exist in the molding of thermoplastic resin.

Heretofore, a full-flighted screw having a low compression ratio has been used as the screw of a thermosetting resin injection molding machine so as to prevent the resin from curing in advance in a cylinder head at the time of plasticization. Therefore, when a composite resin material is used, the material can not fully be kneaded in the cylinder head effectively. Further, since the temperature distribution of the material injected into a mold by one shot of a screw is not uniform in the mold, it is difficult to obtain an uniform-quality molded product. Further, since the molding cycle must be determined taking into consideration a portion the lowest temperature of the injected material, it is difficult to raise production efficiency.

To eliminate the above defects and improve kneading efficiency, a screw having a compression ratio larger than that of the screw of an ordinary thermosetting resin injection molding machine is used in a certain case. In this particular case, shearing force, compression force or the like is induced in the cylinder head to cause heat generation, and then the thermal stability of a molding material deteriorates considerably. To eliminate these defects, a kneading mechanism has been studied and partially put into practical for an in-line screw type thermosetting resin injection molding machine, in which kneading mechanism an appropriate clearance, a groove or a pin is provided at an end of an injection screw between an inner wall of the cylinder head and the injection screw.

However, in these techniques, there has frequently occurred such a problem that, when a plasticized material is supplied to the end of a screw at the time of metering, the plasticized material which has been guided along a screw groove of a full-flighted portion receives resistance because its flow passage is narrowed in the kneading portion at the end of the screw, with the result of a greatly reduced speed of the material being supplied to the end of the screw, or that heat generated in the kneading portion is too large so that the material cures within the cylinder.

SUMMARY OF THE INVENTION

A first object of the present invention is to provide a screw for an in-line screw type thermosetting resin injection molding machine, which can shorten the curing time while maintaining the thermal stability of a thermosetting resin material.

Another object of the present invention is to provide a screw for an in-line screw type thermosetting resin injection molding machine, which can sufficiently knead a thermosetting resin material, and which can improve the molding cycle by raising the temperature of the material and can satisfactorily maintain the thermal stability and the stable charging of the material.

To this end, according to a first aspect of the invention, there is provided a screw for an in-line screw type thermosetting resin injection molding machine, which comprises a full-flighted screw, a resin kneading portion provided in a front end portion of the full-flighted screw, and a groove formed in the resin kneading portion, which groove extends circumferentially and obliquely in the same direction as a flight of the full-flights screw and at an angle of 60° to 85° with respect to an axis of the full-flights screw, the groove including crest portions and trough portions; and a step portion extending along a part of a whole circumferential trough portion, and wherein the difference between the radial dimension of said step portion and an outermost radial dimension of the crest portion is 10% to 60% of a difference between the outermost radial dimension of the crest portion and the innermost radial dimension of the trough portion.

According to a second aspect of the present invention, there is provided a screw for an in-line screw type thermosetting resin injection molding machine, which comprises a full-flighted screw, a resin kneading portion provided in a front end portion of the full-flighted screw and having an axial length 0.5 to 2 times as long as the pitch of the full-flighted screw, and a groove formed in the resin kneading portion, which groove extends circumferentially and obliquely in the same direction as a flight of the full-flighted screw and at an angle of 60° to 85° with respect to an axis of the full-flighted screw.

According to a third aspect of the invention, there is provided a screw for an in-line screw type thermosetting resin injection molding machine, which comprises a full-flighted screw, a resin kneading portion provided in a front end portion of the full-flighted screw and having a length 0.5 to 2 times as long as an outer diameter of the full-flighted screw, the a groove formed in the resin kneading portion, which groove extends circumferentially and obliquely in the same direction as a flight of the full-flighted screw and at an angle of 60° to 85° with respect to an axis of the full-flighted screw.

DESCRIPTION OF PREFERRED EMBODIMENTS

Figure 1:
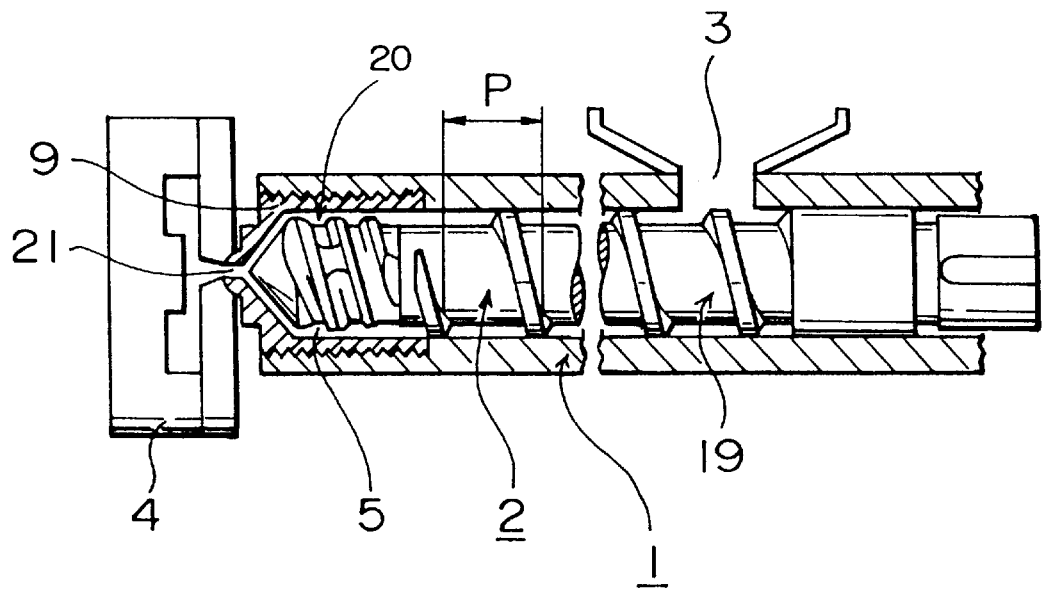
FIG. 1 is a side view showing an entire screw according to an embodiment of the present invention.
Figure 2:
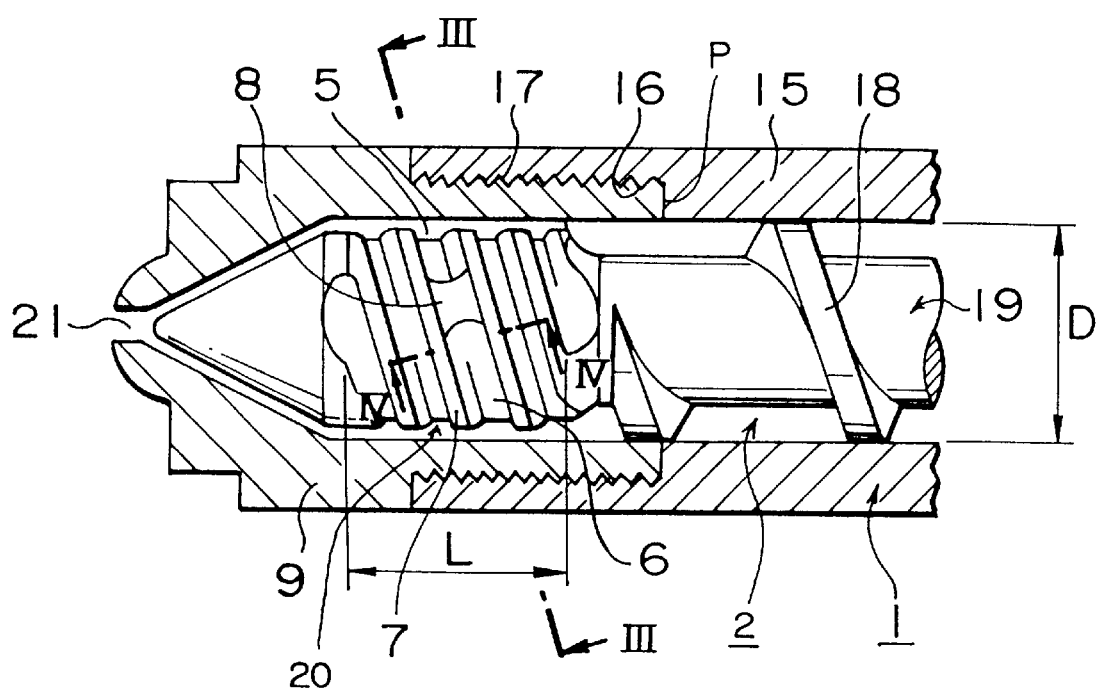
FIG. 2 is a fragmentary enlarged side view showing a resin kneading portion shown in FIG. 1.
Figure 6:
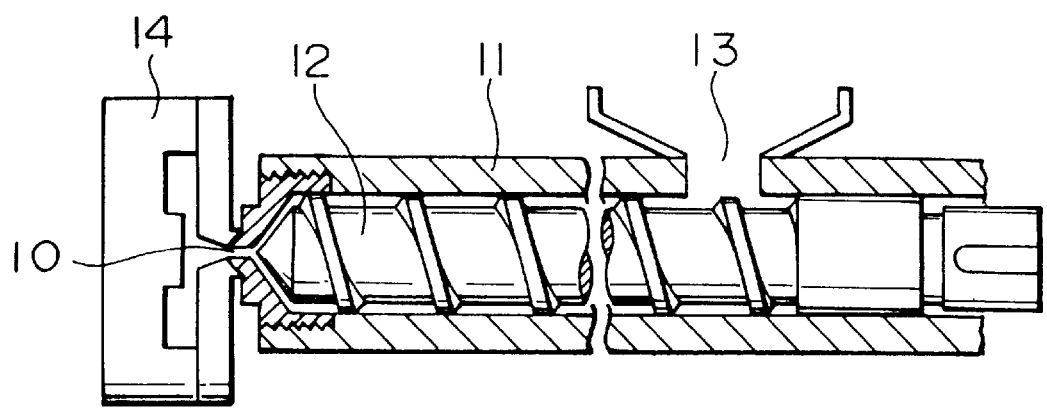
FIG. 6 is a side view showing an entire screw of the prior art.

Referring first to FIG. 1, a screw 2 of the present invention is arranged rotatably in a cylinder 1 having a hopper 3. The thermosetting resin material supplied into the cylinder 1 through the hopper 3 is carried by a rotating full-flighted screw 19 to a resin kneading portion 5 having a groove 20. The material is preheated by a cylinder head 9 and injected into the cavity of a mold 4 through an injection port 21. To the contrary, in the conventional screw shown in FIG. 6, there is no kneading portion in an end portion of the full-flighted screw 19.

In this embodiment of FIG. 1, the material is subjected to strong shearing force between the resin kneading portion 5 and the inner wall of the cylinder head 9 of the cylinder 1 and this shearing force generates heat. The material is heated to a high preheating temperature in the end portion of the cylinder head 9 and is then charged to the mold 4. Because of the high temperature of the material, the curing time within the mold 4 can be drastically shortened in comparison with that of molding using an ordinary full-flighted screw.

Referring next to FIGS. 2 to 5, the resin kneading portion 5 of the present invention is described in detail.

The resin kneading portion 5 located in the end portion of the full-flighted screw 19 is provided with a groove 20 which is inclined in the same direction as the angle $\Theta_1$ (see FIG. 5) of the flight 18 of the full-flighted screw 19, and inclined at an angle $\Theta_2$ of 60° to 85° with respect to an axis of the full-flighted screw 19 and which extends in a circumferential direction. The groove 20 includes crest portions 7 and trough portions 6. The cylinder 1 consists of a cylinder body 15 having a thread portion 16 and a cylinder head 9 having a thread portion 17 which meshes with the thread portion 16. The inner diameter of the cylinder 1 is generally 30 mm to 70 mm. The groove 20 is wound around the full-flighted screw 19 by 2 turns to 4 turns. A step portion 8 is provided along a part of the circumference of the trough portion 6 of the groove 20. The difference $h_1$ between the radial dimension of the step portion 8 and the outermost radial dimension of the crest portion 7 is in a range of 10% to 60% of the difference $h_2$ between the outermost radial dimension of the crest portion 7 and the innermost radial dimension of the trough portion 6 (see FIG. 4).

Figure 3:
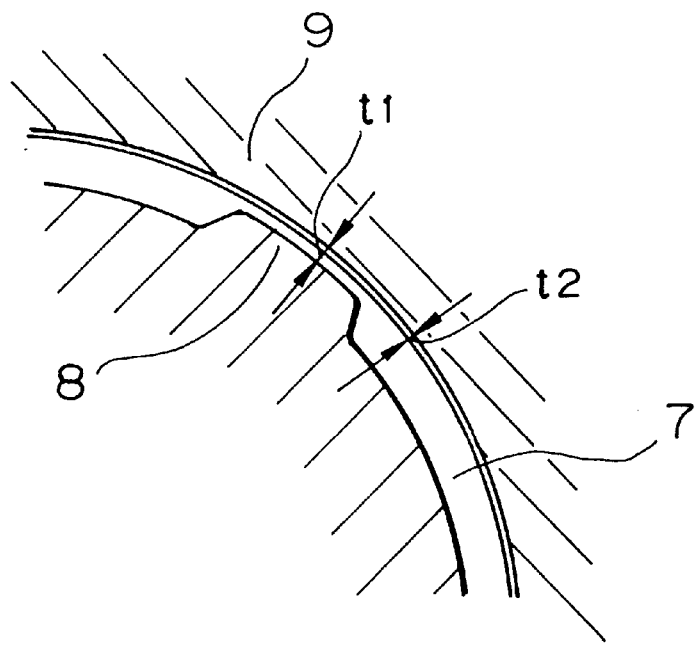
FIG. 3 is a fragmentary enlarged sectional view taken along the line III—III of FIG. 2.
Figure 4:
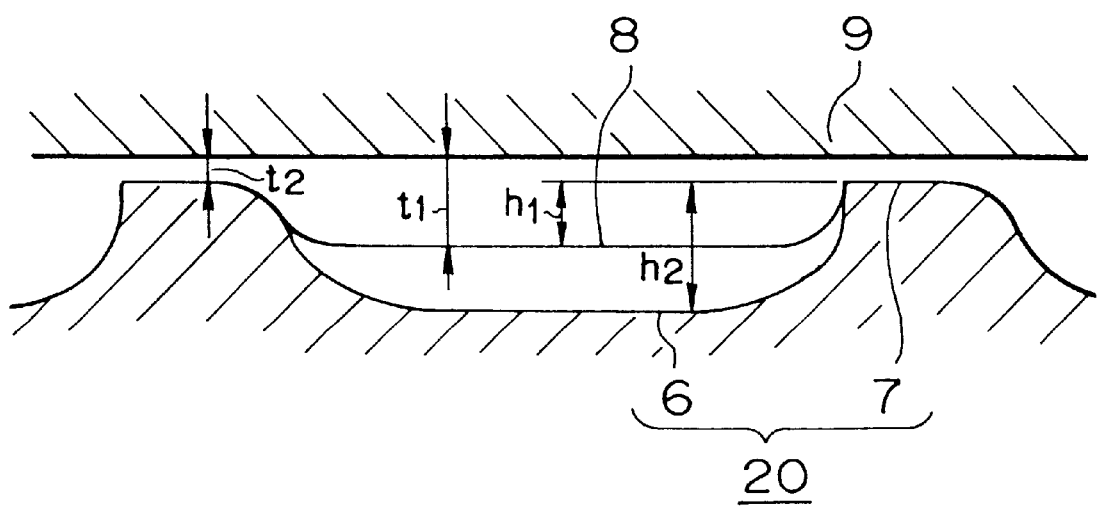
FIG. 4 is a fragmentary enlarged sectional view taken along the line IV—IV of FIG. 2.
Figure 5:
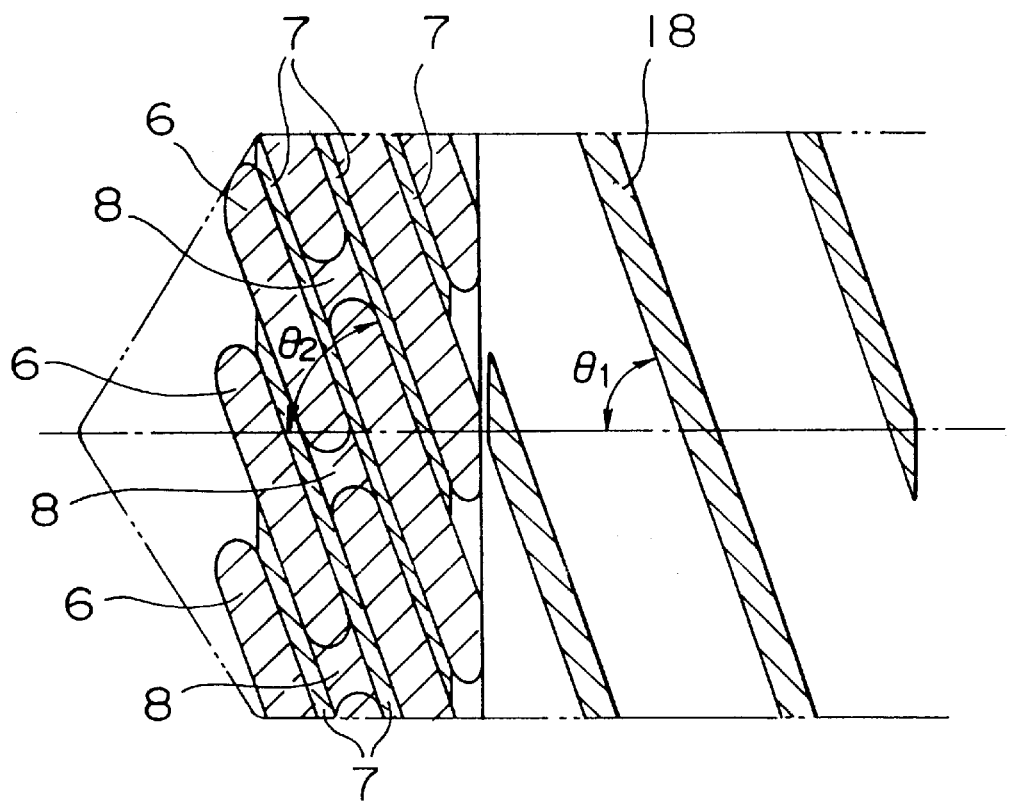
FIG. 5 is a view showing the resin kneading portion developed with respect to the inner wall of a cylinder.

In FIGS. 3 and 4, dimension t1 represents the smallest clearance between the step portion 8 and the inner wall surface of the cylinder head 9, and dimension $t_2$ represents the smallest clearance between the crest portion 7 and the inner wall surface of the cylinder head 9. It is preferable that $t_1$ is in the range of 0.6 mm to 5 mm and $t_2$ is in the range of 0.01 mm to 5 mm. Further, the proportion ($l_1$/L) of an axial length $l_1$ of the trough portion 6 to a total axial length L (=$l_1$+$l_2$), wherein $l_2$ is an axial length of the crest portion 7, is preferably 60% to 95%.

It is clear from the drawings and the description above, that in the embodiment(s) of FIGS. 1–5, the dimensions of the crest portions do not change (other than the interruption provided by the step portion or portions), and also the dimensions of the trough portion or portions do not change along the helical length thereof (again except for the one or more step portions which extend across the trough portion or portions). In other words, the crest 7 is uniform in a diametrical dimension along its helical length, and also the trough is uniform in its diametrical dimension across its helical length as is most clearly evident from FIG. 5.

In the present invention, due to the above-described step portion 8, shearing force is applied to the material passing through the resin kneading portion 5 to heat the material, thereby shortening the curing time. Further, due to the step portion 8, it is made possible to satisfactorily maintain the thermal stability and stable charging of the material.

The dimension of the step portion 8 affects both the curing time of the material, and upon the thermal stability and metering time of the material.

Since the material carried by the full-flighted screw 19 is restricted by a narrow flow passage in the step portion 8 formed in the trough portion 6 of the resin kneading portion 5, the material receives resistance so that the metering time is prolonged. Further, since the thermosetting resin composition receives strong shearing force between the inner wall surface of the cylinder head 9 and the resin kneading portion 5, the temperature of the molten material rises and the curing time after injection into the mold 4 is shortened. However, the material is ready to be cured and its thermal stability within the cylinder head 9 is deteriorated.

In the present invention, it is found that due to the specified limitation of the dimension $h_1$ of the step portion 8, the molding cycle can be greatly improved by shortening the curing time while reasonable stable charging and thermal stability can be maintained.

In the present invention, limiting the angle $\Theta_2$ of the groove 20 to a range of 60° to 85° is intended to effectively maintain both kneading effect and curing time reduction effect.

To further exhibit these effects, it is preferred that a screw has an axial length L of the resin kneading portion 5, which is 0.5 to 2 times as long as the pitch P of the full-flighted screw 19, or 0.5 to 2 times as long as the outer diameter D of the full-flighted screw 19.

Meanwhile, the groove preferably is wound around the resin kneading portion by 2 turns to 4 turns. When the groove is wound around the resin kneading portion by less than 2 turns, the kneading effect is small and the curing time reduction effect is also small. When it is wound around the resin kneading portion by more than 4 turns, the axial width of the groove becomes too narrow, which is not preferred from viewpoints of workability, strength and abrasion resistance of the screw.

Further, it is preferable that a connecting point P (in FIG. 2) between the cylinder body 15 and the cylinder head 9 is so located that the point P faces a proximal end of the kneading portion 5 or a more hopper side portion thereof when the kneading portion 5 is most advanced. According the this provision, the material cured and remained in the kneading portion can be readily removed off the cylinder body 15.

EXAMPLE 1

A thermosetting resin injection molding machine having the following specifications is used.

Clamping force: 100 tons

Inner diameter of cylinder (outer diameter D of screw)=40 mm

An injection screw used in this molding machine has a resin kneading portion at an end thereof and the following specifications.

| | |
|---|---|
| Inclination angle of flight | $\Theta_1$ = 72° 20' |
| Angle of groove in resin kneading portion | $\Theta_2$ = 70° |
| Number of turns of groove around resin kneading portion | n = 3 |

When the proportions of the trough portion 6 and the crest portion 7 in the resin kneading portion are represented by $l_1$ and $l_2$, $l_1/(l_1+l_2) \times 100 = 78\%$.

| | |
|---|---|
| Ratio of length to diameter of resin kneading portion | L/D = 1.0 |

-continued

| | |
|---|---|
| Minimum clearance between crest portion of resin kneading portion and inner wall surface of cylinder head | $t_2 = 2$ mm |

The ratio $h_1/h_2$ is changed between 0% and 70%.

Molding conditions are set as follows:

Temperature of cylinder head: 90° C. (front) to 50° C. (rear)

Charging stroke: about 50 mm

A phenol resin molding material comprising 50% of a wood powder filler is used as a molding material.

Molding is carried out under the above conditions. Results are shown in Table 1.

TABLE 1

| $h_1/h_2$ (%) | Thermal stability | Charging time | Curing time |
|---|---|---|---|
| 0 | X | Δ | ○ |
| 5 | Δ | Δ | ○ |
| 10 | ○ | ○ | ○ |
| 30 | ○ | ○ | ○ |
| 50 | ○ | ○ | ○ |
| 60 | ○ | ○ | Δ |
| 70 | ○ | ○ | X |

(X: not acceptable, Δ: acceptable, ○: good)

EXAMPLE 2

A thermosetting resin injection molding machine having the following specifications is used.

Clamping force: 200 tons

Inner diameter of cylinder (outer diameter D of screw)=60 mm

An injection screw used in this molding machine has a resin kneading portion at an end thereof and the following specifications.

| | |
|---|---|
| Inclination angle of flight | $\Theta_1 = 72°\ 20'$ |
| Angle of groove in resin kneading portion | $\Theta_2 = 70°$ |
| Number of turns of groove around resin kneading portion | $n = 3$ |

When the proportions of the trough portion 6 and the crest portion 7 in the resin kneading portion are represented by $l_1$ and $l_2$, $l_1/(l_1+l_2)\times 100=73\%$.

| | |
|---|---|
| Ratio of length to diameter of resin kneading portion | L/D = 0.8 |
| Minimum clearance between crest portion of resin kneading portion and inner wall surface of cylinder head | $t_2 = 3$ mm |

The ratio $h_1/h_2$ is changed between 0% and 70%.

Molding conditions are set as follows:

Temperature of cylinder head: 90° C. (front) to 50° C. (rear)

Charging stroke: about 100 mm

A phenol resin molding material comprising 50% of a wood powder filler is used as a molding material.

Molding is carried out under the above conditions. Results are shown in Table 2.

TABLE 2

| $h_1/h_2$ (%) | Thermal stability | Charging time | Curing time |
|---|---|---|---|
| 0 | X | Δ | ○ |
| 5 | X | ○ | ○ |
| 10 | Δ | ○ | ○ |
| 30 | ○ | ○ | ○ |
| 50 | ○ | ○ | ○ |
| 60 | ○ | ○ | Δ |
| 70 | ○ | ○ | X |

(X: not acceptable, Δ: acceptable, ○: good)

In accordance with the present invention, the material is fully kneaded in the resin kneading portion, the molding cycle can be improved by raising the temperature of the material. The thermal stability and the stable charging of the material which are contrary to the above characteristic can be satisfactorily maintained. Therefore, this screw is the best suited for use in an in-line screw type thermosetting resin injection molding machine.

According to another embodiment of the present invention, the above-described step portion 8 is not essential. The axial length L of the resin kneading portion 5 should be 0.2 to 2 times as long as the pitch P of the full-flighted screw 19, or 0.5 to 2 times as long as the outer diameter D of the full-flighted screw 19.

EXAMPLE 3

A thermosetting resin injection molding machine having the following specifications is used.

Clamping force: 100 tons

Inner diameter of cylinder (outer diameter D of screw)=40 mm

An injection screw used in this molding machine has a resin kneading portion at an end thereof and the following specifications.

| | |
|---|---|
| Inclination angle of flight | $\Theta_1 = 72°\ 20'$ |
| Angle of groove in resin kneading portion | $\Theta_2 = 70°$ |
| Number of turns of groove around resin kneading portion | $n = 3$ |

When the proportions of the trough portion 6 and the crest portion 7 in the resin kneading portion are represented by $l_1$ and $l_2$, $l_1/(l_1+l_2)\times 100=78\%$.

| | |
|---|---|
| Ratio of length to diameter of resin kneading portion | L/D = 0.3–2.5 |
| Minimum clearance between step portion and inner wall surface of cylinder head | $t_1 = 3.3$ mm |
| Minimum clearance between crest portion of resin kneading portion and inner wall surface of cylinder head | $t_2 = 2$ mm |

The ratio L/D is changed between 0.3 and 2.5.

Molding conditions are set as follows:

Injection pressure: 64.1 MPa

Temperature of cylinder head: 90° C. (front) to 50° C. (rear)

Charging stroke: about 50 mm

A phenol resin molding material comprising 50% of a wood powder filler is used as a molding material.

Molding is carried out under the above conditions. Results are shown in Table 3.

TABLE 3

| L/D | Curing time | Thermal stability | Charging time |
|-----|-------------|-------------------|---------------|
| 0.3 | X | ○ | ○ |
| 0.5 | Δ | ○ | ○ |
| 1.0 | ○ | ○ | ○ |
| 2.0 | ○ | ○ | Δ |
| 2.5 | ○ | X | X |

(X: not acceptable, Δ: acceptable, ○: good)

EXAMPLE 4

A thermosetting resin injection molding machine having the following specifications is used.

Clamping force: 200 tons

Inner diameter of cylinder (outer diameter D of screw): 60 mm

Screw pitch P of the full-flighted screw except for the resin kneading portion 48 mm An injection screw used in this molding machine has a resin kneading portion in an end portion of a full-flighted screw and the following specifications.

Inclination angle of flight $\Theta_1 = 75°42'$

Angle of groove in resin kneading portion $\Theta_2 = 67.5°$

Number of turns of groove around resin kneading portion n=3

When the proportions of the trough portion 6 and the crest portion 7 in the resin kneading portion are represented by $l_1$ and $l_2$, $l_1/(l_1+l_2) \times 100 = 73\%$.

Ratio of length to diameter of resin kneading portion L/D=0.3–2.5

Minimum clearance between step portion and inner wall surface of cylinder head $t_1 = 4.0$ mm Minimum clearance between crest portion of resin kneading portion and inner wall surface of cylinder head $t_2 = 2.3$ mm A ratio L/P of the pitch P to the length L of the resin kneading portion is changed between 0.4 and 3.0

Molding conditions are set as follows:

Injection pressure: 49 MPa

Temperature of cylinder head: 90° C. (front) to 50° C. (rear)

Charging stroke: about 100 mm

A phenol resin molding material comprising 50% of a wood powder filler is used as a molding material.

Molding is carried out under the above conditions. Results are shown in Table 4.

TABLE 4

| L/D | Curing time | Thermal stability | Charging time |
|-----|-------------|-------------------|---------------|
| 0.4 | X | ○ | ○ |
| 0.5 | Δ | ○ | ○ |
| 1.0 | ○ | ○ | ○ |
| 2.0 | ○ | ○ | Δ |
| 3.0 | ○ | X | X |

(X: not acceptable, Δ: acceptable, ○: good)

What is claimed is:

1. A screw for an in-line screw type thermosetting resin injection molding machine, said screw comprising:
    a full-flighted screw;
    means for kneading a thermosetting resin comprising a resin kneading portion provided in a front end portion of said full-flighted screw; and
    a groove formed in said resin kneading portion, said groove extending circumferentially and obliquely in the same direction as a flight of said full-flighted screw and at an angle of 60°0 to 85° with respect to an axis of said full-flighted screw, said groove including a crest portion of uniform dimensions along its length and a trough portion of uniform dimensions along its length, and a step portion provided across a whole circumferential part of said trough portion, and a difference between a radial dimension of said step portion and an outermost radial dimension of said crest portion being 10% to 60% of a difference between the outermost radial dimension of said crest portion and an innermost radial dimension of said trough portion.

2. A screw according to claim 1, wherein an axial length of said resin kneading portion is 0.5 to 2 times as long as a pitch of said full-flighted screw.

3. A screw according to claim 1, wherein an axial length of said resin kneading portion is 0.5 to 2 times as long as an outer diameter of said full-flighted screw.

4. A screw according to claim 1, wherein said groove is wound around said screw by 2 turns to 4 turns.

5. A screw for an in-line screw type thermosetting resin injection molding machine, said screw comprising:
    a full-flighted screw;
    means for kneading a thermosetting resin comprising a resin kneading portion provided in a front end portion of said full-flighted screw, said resin kneading portion having a length 0.5 to 2 times as long as a pitch of said full-flighted screw; and
    a groove formed in said resin kneading portion, said groove including a crest portion of uniform dimensions along its length and a trough portion of uniform dimensions along its length, and a step portion provided across a whole circumferential part of said trough portion, said groove extending circumferentially and obliquely in the same direction as a flight of said full-flighted screw and at an angle of 60° to 85° with respect to an axis of said full-flighted screw.

6. A screw according to claim 5, wherein said groove is wound around said screw by 2 turns to 4 turns.

7. A screw for an in-line screw type thermosetting resin injection molding machine, said screw comprising:
    a full-flighted screw;
    means for kneading a thermosetting resin comprising a resin kneading portion provided in a front end portion of said full-flighted screw; said resin kneading portion having a length 0.5 to 2 times as long as an outer diameter of said full-flighted screw; and
    a groove formed in said resin kneading portion, said groove including a crest portion of uniform dimensions along its length and a trough portion of uniform dimensions along its length, and a step portion provided across a whole circumferential part of said trough portion, said groove extending circumferentially and obliquely in the same direction as a flight of said full-flighted screw and at an angle of 60° to 85° with respect to an axis of said full-flighted screw.

8. A screw according to claim 7, wherein said groove is wound around said screw by 2 turns to 4 turns.

9. In an injection molding machine for molding a thermosetting resin composition, comprising a mold with a cavity and means for injecting a thermosettable resin composition into said mold cavity in liquid form under pressure, whereby said thermosettable resin composition cures to a solid within said mold cavity, the improvement wherein said means for injecting said thermosettable resin into said mold cavity comprises screw means for maintaining stable charging and thermal stability of said thermosettable resin during injection thereof into said mold cavity, while shortening the curing time of said thermosettable resin in said mold cavity, said screw means comprising:

a full-flighted screw; and means for kneading a thermosetting resin comprising a resin kneading portion provided in a front end portion of said full-flighted screw, and including one of (1) a groove formed in said resin kneading portion, said groove extending circumferentially and obliquely in the same direction as a flight of said full-flighted screw and at an angle of 60° to 85° with respect to an axis of said full-flighted screw, said groove including a crest portion of uniform cross-section along its length, and a trough portion of uniform cross-section along its length, and a step portion extending across said trough portion, and a difference between a radial dimension of said step portion and an outermost radial dimension of the crest portion being 10% to 60% of a difference between the outermost radial dimension of said crest portion and an innermost radial dimension of said trough portion;

(2) said resin kneading portion having a length 0.5 to 2 times long as a pitch of said full-flighted screw, and a groove formed in said resin kneading portion, said groove including a crest portion of uniform cross-section along its length, and a trough portion of uniform cross-section along its length, and a step portion extending across said trough portion, said groove extending circumferentially and obliquely in the same direction as a flight of said full-flighted screw and at an angle of 60° to 85° with respect to an axis of said full-flighted screw; and (3) said resin kneading portion having a length 0.5 to 2 times long as an outer diameter of said full-flighted screw, and a groove formed in said resin kneading portion, said groove including a crest portion of uniform cross-section along its length, and a trough portion of uniform cross-section along its length, and a step portion extending across said trough portion, said groove extending circumferentially and obliquely in the same direction as a flight of said full-flighted screw and at an angle of 60° to 85° with respect to an axis of said full-flighted screw.

10. An injection molding machine according to claim 9 wherein said groove is wound around said screw by two turns to four turns.

11. A screw for a thermosetting resin injection molding machine comprising a full-flighted screw;

a resin kneading portion having a plurality of helical crest portions and a plurality of helical trough portions, said trough portions and said crest portions alternating along the axial length of said resin kneading portion, each said trough portion having a step portion extending entirely thereacross, said plurality of crest portions having the same and consistent dimensions with one another, and said plurality of trough portions having the same and consistent dimensions with one another; and each said helical crest portion and each said helical trough portion being uniform along its length and extending circumferentially and obliquely in the same direction as a flight of said full-flighted screw and at an angle of 60° to 85° with respect to the axis of said full-flighted screw, a difference between a radial dimension of said step portion and an outermost radial dimension of said crest portion being 10% to 60% of a difference between the outermost radial dimension of said crest portion and innermost radial dimension of said trough portion.

12. A screw for a thermosetting resin injection molding machine comprising a full-flighted screw;

a resin kneading portion having a plurality of helical crest portions and a plurality of helical trough portions, said trough portions and said crest portions alternating along the axial length of said resin kneading portion, each said trough portion having a step portion extending entirely thereacross, said plurality of crest portions having the same and consistent dimensions with one another, and said plurality of trough portions having the same and consistent dimensions with one another;

each said crest portion and each said trough portion being uniform along its length and extending circumferentially and obliquely in the same direction as a flight of said full-flighted screw and at an angle of 60° to 85° with respect to an axis of said full-flighted screw; and said resin kneading portion having a length 0.5 to 2 times as long as a pitch of said full-flighted screw.

13. A screw for a thermosetting resin injection molding machine comprising a full-flighted screw;

a resin kneading portion having a plurality of helical crest portions and a plurality of helical trough portions, said trough portions and said crest portions alternating along the axial length of said resin kneading portion, each said trough portion having a step portion extending entirely thereacross, said plurality of crest portions having the same and consistent dimensions with one another, and said plurality of trough portions having the same and consistent dimensions with one another;

each said crest portion and each said trough portion being uniform along its length and extending circumferentially and obliquely in the same direction as a flight of said full-flighted screw and at an angle of 60° to 85°0 with respect to an axis of said full-flighted screw; and said resin kneading portion having a length 0.5 to 2 times as long as an outer diameter of said full-flighted screw.

14. An injection molding machine for molding a thermosetting resin composition, comprising a mold with a cavity and means for injecting a thermosettable resin composition into said mold cavity in liquid form under pressure, whereby said thermosettable resin composition cures to a solid within said mold cavity, said means for injecting said thermosettable resin into said mold cavity comprising a screw for maintaining stable charging and thermal stability of the thermosettable resin during injection thereof into said mold cavity, while shortening the curing time of said thermosettable resin in said mold cavity, said screw comprising:

a full-flighted screw; and means for kneading a thermosetting resin comprising a resin kneading portion provided in a front end portion of said full-flighted screw, said resin kneading portion having a plurality of uniform helical crest portions and a plurality of uniform helical trough portions, said trough portions and said crest portions alternating along the axial length of said resin kneading portion, each said trough portion having a step portion extending entirely thereacross, said plurality of crest portions having the same and consistent dimensions with one another, and said plurality of trough portions having the same and consistent dimensions with one another; and wherein said resin kneading portion further has one of (1) each of said crest portions and trough portions extending circumferentially and obliquely in the same direction as a flight of said full-flighted screw and at an angle of 60° to 85° with respect to an axis of said full-flighted screw, and a difference between a radial dimension of said step portion and an outermost radial dimension of the crest portion being 10% to 60% of a difference between the outermost radial dimension of said crest portion and an innermost radial dimension of said trough portion;

(2) said resin kneading portion having a length 0.5 to 2 times as long as a pitch of said full-flighted screw, each said trough portion and crest portion extending circumferentially and obliquely in the same direction as a flight of said full-flighted screw and at an angle of 60° to 85° with respect to an axis of said full-flighted screw; and (3) said resin kneading portion having a length 0.5 to 2 times as long as an outer diameter of said full-flighted screw; each said trough and crest extending circumferentially and obliquely in the same direction as a flight of said full-flighted screw and at an angle of 60° to 85° with respect to an axis of said full-flighted screw.

* * * * *